March 29, 1949.  G. AGINS  2,465,624
COMPUTER DEVICE FOR SOLVING
TRIGONOMETRIC PROBLEMS
Original Filed July 18, 1940  2 Sheets-Sheet 1
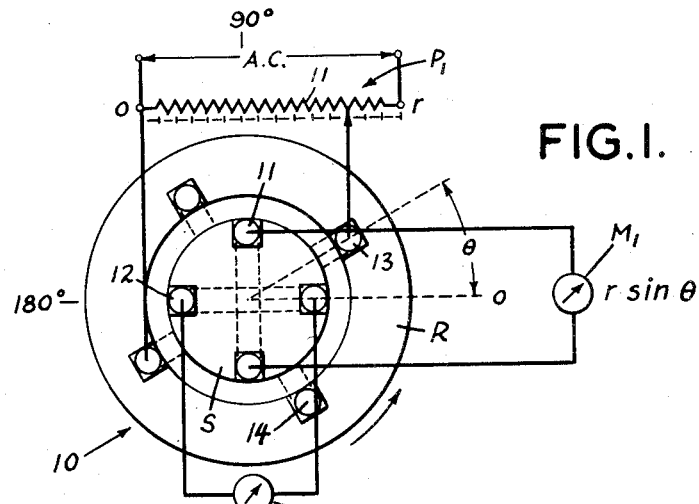
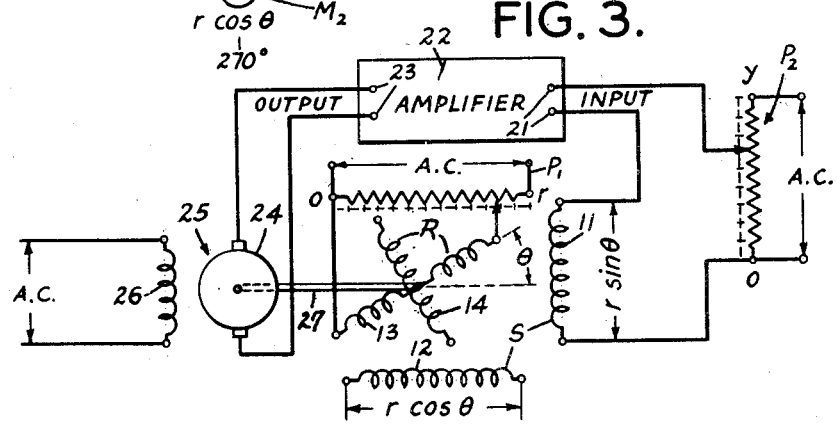
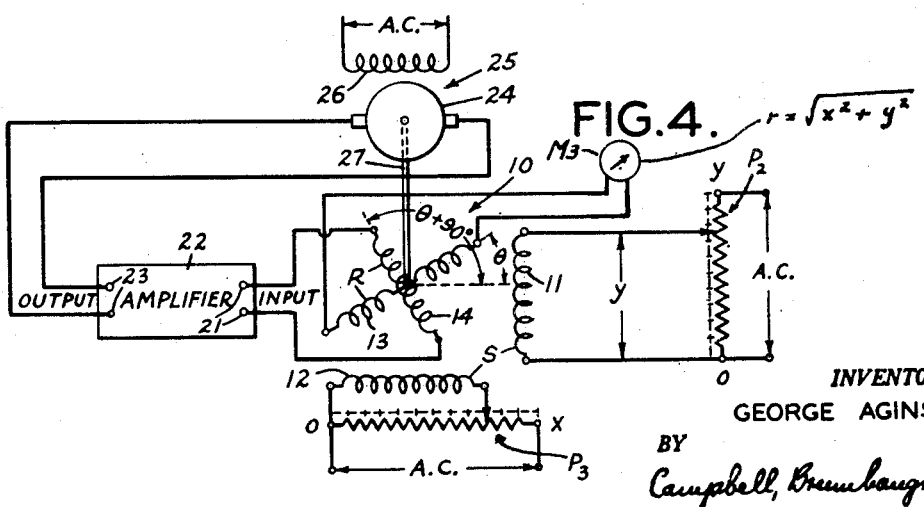
INVENTOR.
GEORGE AGINS
BY
Campbell, Brumbaugh & Free
HIS ATTORNEYS.

Patented Mar. 29, 1949

2,465,624

UNITED STATES PATENT OFFICE 2,465,624

COMPUTER DEVICE FOR SOLVING TRIGONOMETRIC PROBLEMS

George Agins, Brooklyn, N. Y., assignor to Arma Corporation, Brooklyn, N. Y., a corporation of New York Continuation of application Serial No. 346,183, July 18, 1940. This application December 6, 1946, Serial No. 714,608

5 Claims. (Cl. 318—28)

This invention relates to computers and has particular reference to electro-mechanical computers for electrically resolving trigonometric functions from variable angles and radii, composing trigonometric functions into angles and vectors, and obtaining angular displacements in accordance with voltages developed in the computer.

This application is a continuation of my copending application, Serial No. 346,183, filed July 18, 1940, for Computer, now abandoned.

In accordance with the invention, a potential or induction regulator comprising relatively movable rotor and stator, each having independent windings in space quadrature, is utilized as an electric resolver, the rotor being displaced in accordance with an angular input, and potential input is impressed on one of the windings for resolving or composing the input factors trigonometrically to produce output voltages convertible into proportional angular displacements of a member at a corresponding rate and through corresponding angular or linear distance.

It will be seen that, by means of the electromechanical computer of this invention, a resultant vector may be resolved into two mutually perpendicular component vectors; that, conversely, two mutually perpendicular vectors may be composed into a resultant vector; and that the angle between the resultant vector and one of the mutually perpendicular vectors may be obtained. The computer may also be utilized to obtain from angular displacements voltages which are proportional to the trigonometric functions of the angles of displacement, and, conversely, to obtain angular displacements from voltages that are proportional to the trigonometric functions of the angles of displacement. The output of the computer is, accordingly, available either for actuating an indicator, to provide data for use in further calculations, or for energizing or actuating follow-up means for effecting the positioning of mechanical members by other driving means, or for directly driving another computer or a mechanical member, and the like.

For a more complete understanding of the invention, reference may be had to the accompanying drawings, in which:

Figure 1 illustrates a potential regulator utilized as an electric resolver in accordance with this invention for continuously providing voltages proportional to functions of angular displacement angles between the rotor and stator thereof;

Figure 3 is a schematic illustration of an arrangement of this invention for continuously solving an angle from two input voltages whose ratio is equal to a function of the angle; and Figure 4 is a schematic illustration of an arrangement of this invention for continuously solving an angle and resultant vector from corresponding voltage inputs given as the function of the angle.

Figure 2:
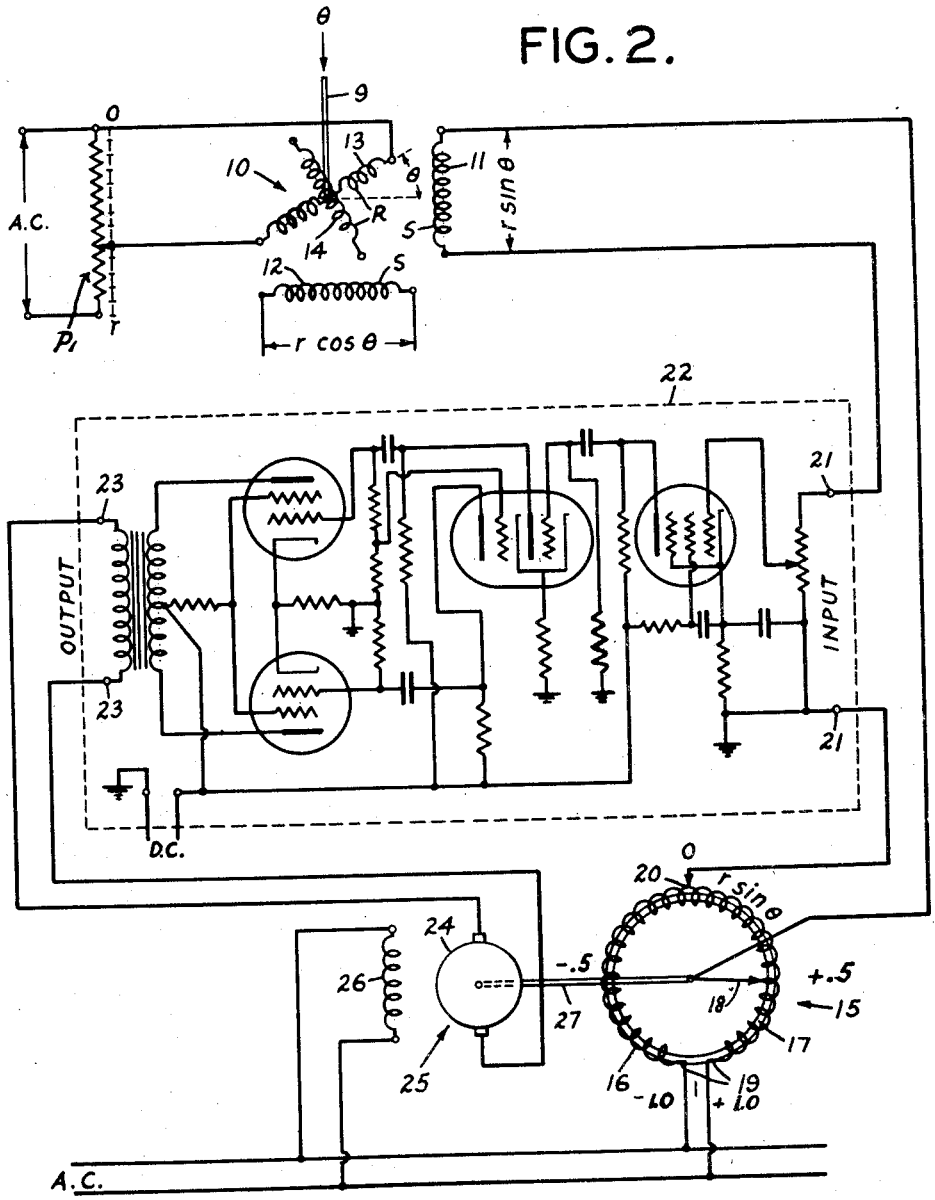
Figure 2 is a schematic illustration of an arrangement of this invention for converting the continuous voltage output of the potential regulator of Figure 1 into proportionate mechanical displacement.

Referring to Figure 1 of the drawings, numeral 10 designates a potential or induction regulator comprising a drum-shaped, laminated iron rotor R rotatable about a cylindrical laminated iron stator S. Positioned in slots in the stator S are two independent windings 11 and 12 in space quadrature. Similarly positioned in slots on the inner surface of the rotor R are two independent windings 13 and 14 in space quadrature.

The potential regulator 10 so constructed is used as an electric resolver by rotating the rotor R relatively to the stator S to change the mutual inductance between the primary and secondary windings. The rotor R may be revolved by a shaft, gearing or the like. In the embodiment shown, rotor winding 13 is utilized as the primary winding and the two stator windings 11 and 12 serve as the secondary windings. The null rotor winding 14 is not used in this case. Thus, as is indicated diagrammatically in Figure 1, the magnitude of the alternating current voltage $r$ which is applied to the primary winding 13 from any suitable source such as the potentiometer $P_1$, for example, is representative of the radius input to the resolver, and the angular displacement of the rotor R from its zero or non-inductive position is the angle $\theta$ input to the resolver. For simplicity, the maximum ratio of voltage transformation between the rotor and stator windings is considered to be 1 to 1, but obviously other ratios may be used as desired or required.

In operation of the arrangement of Figure 1 with a mechanical input of angle $\theta$, and an electrical input of radius $r$ from the potentiometer $P_1$, the mutual inductance between the primary winding 13 and the secondary windings 11, 12, of the potential regulator 10, produces an alternating current voltage proportional to $r \sin \theta$ across the terminals of the secondary winding 11, which may be indicated by any suitable indicating instrument $M_1$, for example, and also simultaneously produces an alternating current voltage proportional to $r \cos \theta$ across the terminals of secondary winding 12, which may be indicated by any suitable indicating instrument M2, for example. It will be understood that the secondary voltages are always practically in time phase with, or in time phase opposition to, the primary voltage, depending upon the sign of the sine and cosine functions of the angle $\theta$.

The electrical output of $r \sin \theta$ by the regulator of Figure 1 may be converted into a proportional mechanical displacement with the arrangement illustrated in Figure 2, in which the potential regulator 10 is shown diagrammatically and its rotor R is adjustable relatively to the stator S by a shaft 9, or the like. The stator winding 11 of the regulator 10 is connected in series opposition to a portion of a voltage divider 15, as shown. The voltage divider 15 may be of the form in which a wire 16 of uniform cross-section is evenly wound helically around a non-inductive ring 17 and is engaged by a movable contact or brush 18, electrically connected to one terminal of stator winding 11.

The end taps 19 of the wire helix 16 of divider 15 are connected to a source of constant alternating current, and the center tap 20 thereof is connected to one of the input terminals 21 of electronic amplifier 22, which may be of any suitable high gain type, such as the construction shown in the drawing, which is self-explanatory. The other input terminal 21 of the amplifier 22 is connected to the remaining terminal of the stator winding 11 of regulator 10. It will be observed that the portion of the voltage divider 15 that is in series opposition with the stator winding 11 lies between movable contact 18 and center tap 20, and is also connected in series with the input terminals 21 of amplifier 22.

The output terminals 23 of the amplifier 22 are connected to the armature 24 of motor 25, which is a shunt wound alternating current motor whose field winding 26 is energized from a constant alternating current source, as shown. The armature 24 of motor 25 is operatively connected by shaft 27 to the movable contact 18 of the divider 15. It will be observed that because of the uniformity of the helix 16 and the constancy of the voltage applied thereto, the voltage across center tap 20 and movable contact 18 of the divider 15 is always directly proportional to the angular displacement of the movable contact 18 from the center tap 20, regardless of the change in its position effected by motor 25.

In operation of the arrangement of Figure 2, displacement of rotor R by shaft 9 relatively to stator S through angle $\theta$ and energization of the rotor winding 13 by voltage $r$ results in the induction of voltage in stator winding 11 equal to $r \sin \theta$. The voltage supplied to the input of amplifier 22 is equal to the difference between the $r \sin \theta$ voltage output of the regulator 10 and the voltage across center tap 20 and movable contact 18 of the voltage divider 15. This voltage, amplified at 22, energizes motor 25, which, by means of its shaft 27, drives the movable contact 18 of divider 15 in the direction which reduces to zero the input voltage to the amplifier 22, so that the motor 25 deenergizes itself.

Inasmuch as the movement of the contact 18 correspondingly decreases the aforementioned voltage difference to zero, it follows that the voltage across center tap 20 and movable contact 18 of the divider 15 is equal to the $r \sin \theta$ voltage output of the regulator 10, and the angular displacement of movable contact 18 from center tap 20 of the divider 15 is directly proportional to the $r \sin \theta$ voltage output of the regulator 10.

Accordingly, by means of the arrangement of Figure 2, any mechanical input of angle $\theta$ and any electrical input of $r$, to the potential regulator 10, results in the development of an output voltage equal to $r \sin \theta$ which is converted exactly into a proportional mechanical displacement by means of motor 25, located at a local or remote point for operating additional repeating equipment, calculating apparatus, or the like.

Similarly, if the $r \cos \theta$ voltage output of regulator 10, i. e., the voltage across the terminals of stator winding 12, is utilized instead of the $r \sin \theta$ voltage output across winding 11, the angular displacement of contact 18 from center tap 20 of the divider 15 is directly proportional to the $r \cos \theta$ output of the regulator 10.

Figure 3 illustrates an arrangement utilizing the potential regulator 10 for obtaining the angle $\theta$, the sine function of which is $$\frac{y}{r}, \left(\sin^{-1} \frac{y}{r}\right)$$

where $r$ is the magnitude of the voltage impressed on the rotor winding 13 and $y$ is the magnitude of input voltage from a separate independent source. As in Figures 1 and 2, the primary winding 13 of the regulator 10 is connected to voltage input $r$ from the potentiometer P1, for example, but the secondary winding 11 thereof is connected in series opposition with the voltage input $y$ from a second potentiometer P2, and in series with the input terminals 21 of the electronic amplifier 22, which may be of the same construction as that illustrated in Figure 2.

The output terminals 23 of the amplifier 22 are connected to the armature 24 of the shunt wound alternating current motor 25 whose field winding 26 is energized from a constant alternating current source. The shaft 27 of the motor armature 24 is operatively connected to the rotor R of regulator 10 for rotating the same relatively to the stator S.

In operation of the arrangement illustrated in Figure 3, the input to the amplifier 22, which is $y$ when the rotor R of regulator 10 is in neutral or zero position, results in energization of the motor armature 24 by the output of amplifier 22, so that the motor revolves rotor R of the regulator 10 to a position where the output voltage of the secondary winding 11 of the regulator 10 is equal in magnitude to the opposed voltage $y$. The input voltage to the amplifier 22 accordingly becomes zero, resulting in deenergization of motor armature 24 and stopping of the rotor R when the latter has been displaced through the angle $\theta$ from its zero position.

Inasmuch as the output voltage of primary winding 11 is equal to $y$, then $$y = r \sin \theta$$

$$\sin \theta = \frac{y}{r}$$

and $$\theta = \sin^{-1} \frac{y}{r}$$

which is the angle sought as the result of the inputs $r$ and $y$, and the displacement of the rotor R of regulator 10 in response to these voltage inputs may be utilized as a measurement or for actuating a follow-up to drive a heavy element, or the like.

Similarly, if the secondary winding 12 of the potential regulator 10 in Figure 3 is used instead of secondary winding 11, and secondary winding 12 is connected in series opposition with an electrical input of $x$, and in series with the input terminals 21 of amplifier 22, the angular displacement of the rotor R of the regulator 10 from its zero position is $\theta$, the angle whose cosine is $$\frac{x}{r}, \left(\cos^{-1}\frac{x}{r}\right)$$

as is shown by the following equations:

$$x = r\cos\theta$$

$$\cos\theta = \frac{x}{r}$$

$$\theta = \cos^{-1}\frac{x}{r}$$

Figure 4 illustrates an arrangement utilizing the potential regulator 10 for obtaining the angle $\theta$ whose tangent is $$\frac{y}{x}, \left(\tan^{-1}\frac{y}{x}\right)$$

where $x$ is the electrical input to stator winding 12 from a potentiometer P3, for example, and $y$ is the electrical input to stator winding 11 from the potentiometer P2, for example, the voltages of which are in time phase with, or in time phase opposition to each other, depending on the sign of the tangent of angle $\theta$. Here, the null winding 14 of the rotor R of regulator 10 is connected across the input terminals 21 of the electronic amplifier 22, whose output terminals 23 are connected to the armature 24 of shunt motor 25 whose field winding is energized from the alternating current source, and whose shaft 27 is connected to rotor R, as shown.

In operation of the arrangement of Figure 4, the energization of stator windings 11 and 12 by respective electrical inputs $y$ and $x$ from the potentiometers P2 and P3, respectively, induces a voltage in rotor null winding 14, which is amplified at 22 and impressed on the armature 24 of motor 25. The motor 25, accordingly, rotates rotor R of regulator 10 in the proper direction to reduce to zero the voltage induced in null winding 14, whereupon the motor 25 deenergizes itself and comes to rest after having displaced rotor R from zero position through the angle $\theta$. Inasmuch as null winding 14 is displaced 90° ahead of winding 13, null winding 14 is displaced $\theta+90°$ from zero position of winding 13. The value of the angle $\theta$ is shown from the following equations:

$$y\sin(\theta+90°) + x\cos(\theta+90°) = 0$$

$$y\cos\theta - x\sin\theta = 0$$

$$y = x\tan\theta$$

$$\tan\theta = \frac{y}{x} \qquad \theta = \tan^{-1}\frac{y}{x}$$

It also follows that, when the resultant voltage induced in null winding 14 of the rotor R of regulator 10 is zero, the resultant voltage induced in rotor winding 13 is equal to the square root of the sum of the squares of the component inputs $y$ and $x$, since the angle $\theta$ is the result of the voltage inputs $x$ and $y$, as is shown by the following equations:

$$r = x\cos\theta + y\sin\theta$$

$$r = \sqrt{x^2 + y^2}$$

It will thus be seen that the arrangement of Figure 4 provides a simple and accurate electric computer for composing two mutually perpendicular vectors into a resultant, which may be indicated by a suitable indicating instrument M3, for example, and for obtaining the angle between the resultant and one of the mutually perpendicular vectors. The system of Figure 4 may be similarly employed for obtaining $\theta$, the angle whose cotangent is $$\frac{x}{y}, \left(\cot^{-1}\frac{x}{y}\right)$$

inasmuch as $x$ and $y$ are the electrical inputs for $\tan\theta$ and $\cot\theta$.

Where it is desired to obtain $\theta$, the angle whose secant is $$\frac{r}{x}, \left(\sec^{-1}\frac{x}{r}\right)$$

and whose cosecant is $$\frac{r}{y}, \left(\csc^{-1}\frac{r}{y}\right),$$

the arrangement of Figure 3 may be employed, inasmuch as $r$ and $y$ are the electrical inputs for $\sin\theta$ and $\csc\theta$, and $r$ and $x$ are the electrical inputs for $\cos\theta$ and $\sec\theta$. With input $x$ applied in series opposition to stator winding 12 and in series with the input terminals 21 of amplifier 22, the armature of motor 25 is energized and rotates rotor R to a position where the magnitude of the output voltage of stator winding 12 is equal to the opposed voltage $x$, thus deenergizing the motor after it has revolved rotor R from zero through the angle $\theta$. Since the output voltage of primary winding 12 is equal to $x$, then $$x = r\cos\theta$$

$$\cos\theta = \frac{x}{r}$$

and $$\theta = \sec^{-1}\frac{r}{x}$$

In the case where stator winding 11 is used in Figure 3 instead of stator winding 12 and the voltage impressed thereon is $y$, then $$y = r\sin\theta$$

$$\sin\theta = \frac{y}{r}$$

and $$\theta = \csc^{-1}\frac{r}{y}$$

Accordingly, with the various arrangements illustrated, and equivalents or obvious modifications thereof, many trigonometric functions in terms of output voltages may be continuously obtained, as well as displacements of mechanical elements from trigonometric voltage inputs and the like. As indicated, the computer of this invention has wide and varied application for continuously solving problems incident to variable angle and vector determination and for continuously developing mechanical movements or displacements, such as for gun fire control purposes.

Although certain preferred embodiments of the invention have been illustrated and described herein, it is to be understood that the invention is not limited thereby, but is susceptible of changes in form and detail within the scope of the appended claims.

I claim:

1. In an electromechanical computer for electrically making computations involving a resultant vector, the rectangular component vectors of such resultant vector, and an angle between said resultant vector and one of said component vectors, the combination of electrical means providing an alternating current output representative of one of said vectors, a potential regulator having a first winding connected to receive the output of said electrical means and having a second winding, said first and second windings being rotatable relatively to one another so that the voltage induced in said second winding is a trigonometric function of the relative angular displacement between said first and second windings, second electrical means connected to supply to said second winding an alternating voltage representative of another of said vectors, electric motive means for producing relative displacement between said first and second regulator windings, and electrical means responsive to the difference between the voltage induced in said second winding and the alternating voltage from said second electrical means for energizing said electric motive means to produce a relative angular displacement between said first and second windings that is representative of said angle between the resultant vector and one of the component vectors.

2. In an electromechanical computer for electrically making computations involving a resultant vector, the rectangular component vectors of such resultant vector, and an angle between said resultant vector and one of said component vectors, the combination of first electrical means providing an alternating current output representative of one of said vectors, second electrical means providing an alternating current output representative of a second vector, a potential regulator having one pair of windings disposed in space quadrature and connected to said first and second electrical means, respectively, and having a second pair of windings disposed in space quadrature, said pairs of windings being rotatable relatively to one another such that the voltages induced in said second pair of windings are trigonometric functions of the relative angular displacement between said first and second pairs of windings, and electric motive means responsive to the output from one of the windings of said second pair for producing a relative displacement between said first and second pairs of windings commensurate with said angle between the resultant vector and one of the component vectors, whereby the output of the other winding of said second pair is representative of a third of said vectors.

3. In an electromechanical computer, the combination of a potential regulator, comprising relatively movable rotor and stator members each having two windings in space quadrature, means for energizing the stator windings at voltages representing different component vector qualities, an amplifier, connections between one of said rotor windings and the input to said amplifier, motive means connected to the output of said amplifier, and operative connections between said motive means and said rotor, whereby the voltage induced in said one rotor winding causes the motive means to rotate the rotor through an angle such that the voltage induced in said one winding thereof becomes zero and the voltage output induced in the other rotor winding is a function of the magnitude of the vector resultant of said stator input voltages.

4. In an electromechanical computer for electrically composing rectangular vector components into resultant vectors at variable angles, the combination of a potential regulator comprising relatively movable rotor and stator members each having two windings in space quadrature, means for energizing the stator windings in accordance with the magnitudes of two component vector quantities, respectively, an amplifier, electrical connections between one of said rotor windings and the input to said amplifier, motive means connected to the output of said amplifier, and operative connections between said motive means and said rotor member, whereby the voltage induced in said one rotor winding causes the motive means to rotate the rotor member through an angle such that the voltage in said one winding is reduced to zero, while the voltage induced in the other rotor winding is a function of the magnitude of the vector resultant of the said two component vector quantities and the angular displacement of the said rotor member is equal to the angle of the resultant vector.

5. In an electromechanical computer for electrically making computations involving a resultant vector, the rectangular component vectors of such resultant vector, and an angle between said resultant vector and one of said component vectors, the combination of electrical means providing two alternating current outputs whose ratio is equal to a trigonometric function of said angle, a potential regulator having a plurality of windings, at least one of said windings being rotatable relatively to the others, means connecting the alternating current outputs of said electrical means to two of said windings, respectively, thereby inducing in at least one of said windings a voltage that is a trigonometric function of the relative angular displacement between said windings, electric motive means for producing relative displacement between said windings, and electrical means connected to said one of the windings in which said voltage is induced for energizing said electric motive means to produce a relative angular displacement between said windings that is representative of said angle.

GEORGE AGINS.

REFERENCES CITED

The following references are of record in the file of this patent:

UNITED STATES PATENTS

| Number | Name | Date |
|--------|------|------|
| 1,973,279 | Bernarde | Sept. 11, 1934 |
| 2,288,628 | Lee | July 7, 1942 |
| 2,336,492 | Mackay | Dec. 14, 1943 |